US012732004B2

(12) United States Patent
Ozaki

(10) Patent No.: US 12,732,004 B2
(45) Date of Patent: Sep. 8, 2026

(54) BATTERY CIRCUIT, CELL BALANCE CONTROL SYSTEM, AND STATE ESTIMATION APPARATUS

(71) Applicant: ISUZU MOTORS LIMITED, Kanagawa (JP)

(72) Inventor: Sho Ozaki, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 769 days.

(21) Appl. No.: 18/187,051

(22) Filed: Mar. 21, 2023

(65) Prior Publication Data

US 2023/0327461 A1 Oct. 12, 2023

(30) Foreign Application Priority Data

Mar. 23, 2022 (JP) ................................ 2022-047415

(51) Int. Cl.

| | |
|---|---|
| ***H01M 10/46*** | (2006.01) |
| ***H01M 10/42*** | (2006.01) |
| ***H01M 10/44*** | (2006.01) |
| ***H01M 10/48*** | (2006.01) |
| ***H01M 50/51*** | (2021.01) |
| ***H02J 7/54*** | (2026.01) |
| ***H02J 7/80*** | (2026.01) |

(52) U.S. Cl.

CPC ............ *H02J 7/54* (2026.01); *H01M 10/425* (2013.01); *H01M 10/44* (2013.01); *H01M 10/48* (2013.01); *H01M 50/51* (2021.01); *H02J 7/80* (2026.01); *H01M 2010/4271* (2013.01)

(58) Field of Classification Search

CPC ...... H02J 7/0016; H02J 7/0047; H01M 50/51; H01M 10/44; H01M 10/425; H01M 2010/4271

USPC ......... 320/107, 116, 118, 119, 122, 132, 149

See application file for complete search history.

(56) References Cited

U.S. PATENT DOCUMENTS

| | | | | |
|---|---|---|---|---|
| 8,994,337 B2 * | 3/2015 | Kim | H02J 7/0016 320/136 |
| 2023/0344248 A1 * | 10/2023 | Park | H02J 7/0019 |

FOREIGN PATENT DOCUMENTS

| | | | |
|---|---|---|---|
| JP | 2019-161730 A | 9/2019 | |
| JP | 2021-047032 A | 3/2021 | |
| KR | 20170065322 A * | 6/2017 | B60L 11/1866 |
| WO | WO-2008015933 A1 * | 2/2008 | H02J 7/345 |

* cited by examiner

*Primary Examiner* — Edward Tso

(74) *Attorney, Agent, or Firm* — Shih IP Law Group, PLLC

(57) ABSTRACT

A battery circuit including: a cell group composed of a plurality of battery cells C connected in series; a resistor group composed of a plurality of resistors R connected in series; and a connection/disconnection section configured to connect the cell group to the resistor group disconnectably, in which the connection/disconnection section is configured to be capable of changing a number of the resistors R connected in series to any one target cell of the plurality of battery cells C.

2 Claims, 4 Drawing Sheets

BATTERY CIRCUIT, CELL BALANCE CONTROL SYSTEM, AND STATE ESTIMATION APPARATUS

CROSS REFERENCE TO RELATED APPLICATIONS

This application is entitled to the benefit of Japanese Patent Application No. 2022-047415, filed on Mar. 23, 2022, the disclosure of which including the specification, drawings and abstract is incorporated herein by reference in its entirety.

TECHNICAL FIELD

The present disclosure relates to a battery circuit, a cell balance control system, and a state estimation apparatus.

BACKGROUND ART

Patent Literature (hereinafter, referred to as "PTL") 1 discloses a cell balance circuit for equalizing voltage values of a plurality of battery cells in a battery including the plurality of battery cells connected in series. The cell balance circuit includes a plurality of resistors connected in series and a plurality of switches disposed between the battery cells and the resistors. Each of the plurality of switches is disposed between one end side of each resistor and a positive electrode side of each battery cell, and is switched on/off under the control of the cell balance control apparatus. When the switch is turned on, the battery cell connected to the switch is discharged through the resistor, and the voltage value of the battery cell decreases. By discharging the battery cell having a voltage value higher than that of another battery cell, the voltage values of the plurality of battery cells can be equalized.

PTL 2 discloses an estimation apparatus capable of estimating a state of each part of an onboard battery by using an electrochemical impedance method. The estimation apparatus detects a current flowing through the battery, detects a voltage between terminals of the battery, calculates an impedance spectrum of an internal impedance of the battery based on frequency components included in waveforms of the current and the voltage detected at the same timing, and estimates a state of the battery based on the calculated impedance spectrum.

CITATION LIST

Patent Literature

PTL 1
Japanese Patent Application Laid-Open No. 2019-161730
PTL 2
Japanese Patent Application Laid-Open No. 2021-47032

SUMMARY OF INVENTION

Technical Problem

In the cell balance circuit of PTL 1, one resistor is connected to one battery cell (target cell). The amount (current value) of current flowing during discharge is determined based on the resistance (resistance value) of the resistor connected to the target cell. The discharge rate of the target cell during discharge (the rate of a voltage drop) increases as the resistance value of the connected resistor decreases. In order to shorten balance adjustment time, it is advantageous that the resistance value of the resistor connected to the target cell is small and the amount of current to be supplied is large. On the other hand, for highly accurate balance adjustment, it is advantageous that the resistance value of the resistor connected to the target cell is large and the amount of current to be supplied is small. In order to reliably perform the balance adjustment with a desired accuracy in the cell balance circuit of PTL 1, it is necessary to set the resistance value of the resistor connected to the target cell to a large value to a certain degree. Accordingly, it is not possible to shorten the balance adjustment time.

In addition, the amount of current flowing through the target cell is small in the case where the state of the target cell of the cell balance circuit of PTL 1 is estimated by a rectangular wave impedance method, which is a kind of electrochemical impedance method, by creating a rectangular wave at an arbitrary frequency by using the switch and the resistor of the cell balance circuit. Accordingly, the detected current value is affected by noise, and there is a possibility that an appropriate estimation result cannot be obtained.

Accordingly, the present disclosure aims to provide a battery circuit capable of increasing or decreasing the amount of current flowing during discharge of any one of a plurality of cells.

Solution to Problem

In order to achieve the above target, a first aspect of the present disclosure is a battery circuit including a cell group composed of a plurality of battery cells connected in series; a resistor group composed of a plurality of resistors connected in series; and a connection/disconnection section configured to connect the cell group to the resistor group disconnectably, in which the connection/disconnection section is configured to be capable of changing a number of the resistors connected in series to any one target cell of the plurality of battery cells.

A second aspect of the present disclosure is a cell balance control system including a battery circuit of the first aspect and being configured to adjust a cell balance by discharging the target cell, the cell balance control system including a connection/disconnection control section. The connection/disconnection control section configured to control the connection/disconnection section such that a predetermined number of the resistors are connected in series to the target cell at a start of adjustment of the cell balance and the number of the resistors connected in series to the target cell increases from the predetermined number after a predetermined time elapses since the start of adjustment of the cell balance.

A third aspect of the present disclosure is a state estimation apparatus configured to detect a current flowing through a target cell of a battery circuit of the first aspect, detect a voltage of the target cell, calculate an impedance spectrum of an internal impedance of the target cell based on a frequency component included in a waveform of each of the current and the voltage detected at a same timing, and estimate a state of the target cell based on the impedance spectrum calculated, the state estimation apparatus including a connection/disconnection control section configured to control the connection/disconnection section such that one resistor is connected in series to the target cell.

Advantageous Effects of Invention

According to a battery circuit of the present disclosure, it is possible to increase or decrease the amount of current flowing during discharge of any one of a plurality of cells.

DESCRIPTION OF EMBODIMENTS

Figure 1:
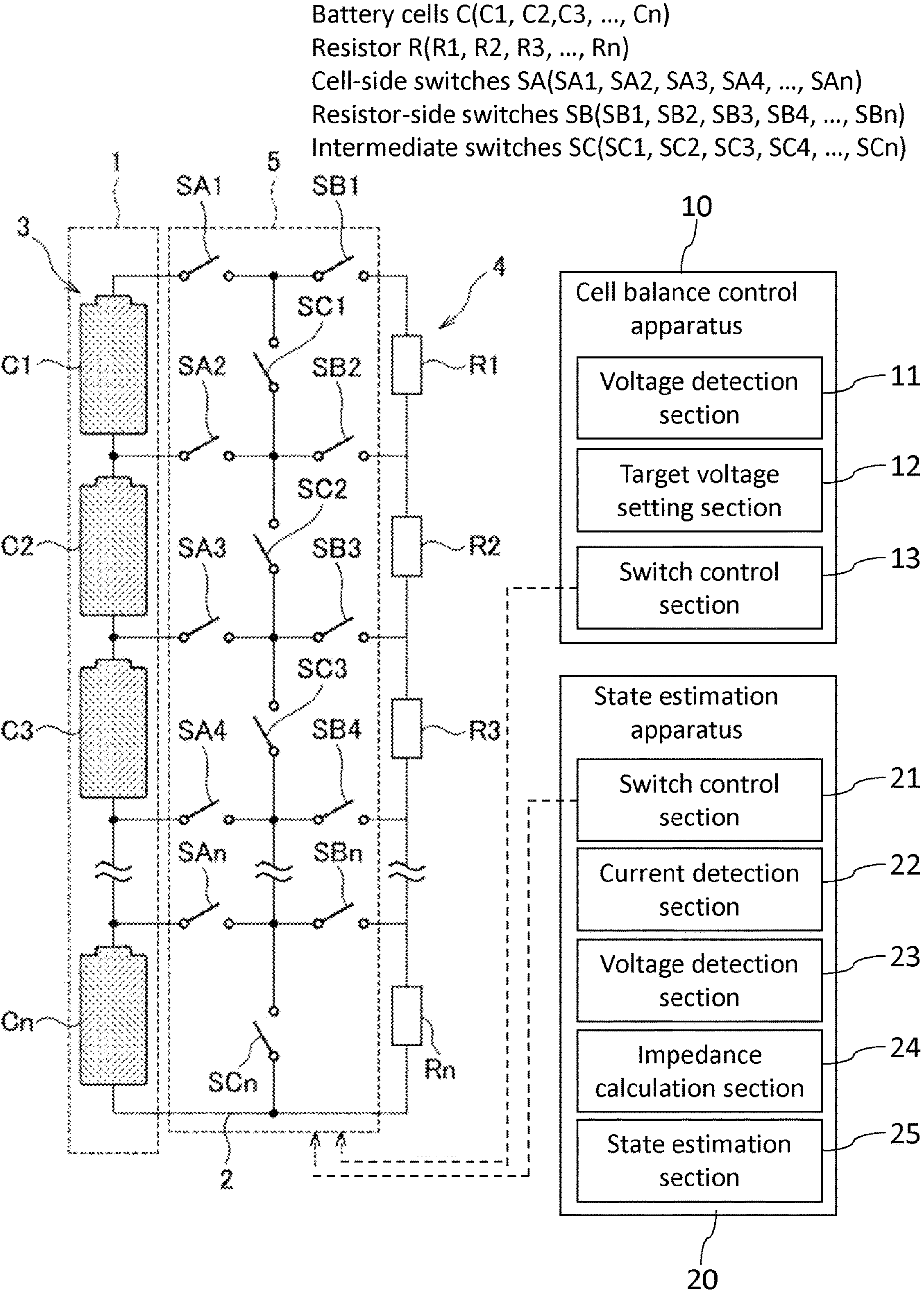
FIG. 1 is a block diagram illustrating a cell balance control system and a state estimation apparatus according to one embodiment of the present disclosure.

Hereinafter, one embodiment of the present disclosure will be described with reference to the drawings. A cell balance control system of the present embodiment is a system mounted in a vehicle such as an electric vehicle or a hybrid vehicle, and executes a cell balance control of battery (battery pack) 1 as illustrated in FIG. 1. The cell balance control system includes battery 1, cell balance circuit 2, and cell balance control apparatus 10.

Battery 1 is a rechargeable battery charged by being supplied with electric power from an external AC power source or the like, and includes cell group 3 composed of a plurality (n) of battery cells C (first cell C1, second cell C2, third cell C3, n-th cell Cn) connected in series. Each of battery cells C is, for example, a secondary battery such as a lithium ion battery.

Cell balance circuit 2 is a circuit that equalizes voltage values of a plurality of battery cells C constituting battery 1 to adjust the cell balance, and includes resistor group 4 composed of a plurality (n) of resistors R (first resistor R1, second resistor R2, third resistor R3, and n-th resistor Rn) connected in series, and connection/disconnection section 5 disposed between cell group 3 and resistor group 4 so as to connect and disconnect cell group 3 and resistor group 4.

Resistors R are disposed to battery cells C in a one-to-one manner, and all the resistance values of resistors R are set equally.

Connection/disconnection section 5 is configured to be capable of changing the number of resistors R connected in series to any one target cell of the plurality of battery cells C. Connection/disconnection section 5 of the present embodiment connects cell group 3 and resistor group 4 such that it is ensured that resistor R corresponding to the target cell is connected to the target cell in series (for example, such that first resistor R1 is certainly connected in series, when the target cell is first cell C1).

Connection/disconnection section 5 of the present embodiment includes a plurality of (n) cell-side switches SA (first cell-side switch SA1, second cell-side switch SA2, third cell-side switch SA3, fourth cell-side switch SA4, . . . , n-th cell-side switch SAn), a plurality of (n) resistor-side switches SB (first resistor-side switch SB1, second resistor-side switch SB2, third resistor-side switch SB3, fourth resistor-side switch SB4, . . . , n-th resistor-side switch SBn), a plurality of (n) intermediate switches SC (first intermediate switch SC1, second intermediate switch SC2, third intermediate switch SC3, . . . , n-th intermediate switch SCn).

Cell-side switch SA and resistor-side switch SB are two switches disposed in series on a connecting line connecting one end side of resistor R and the positive electrode side of battery cell C. The switch disposed on the cell side is cell-side switch SA and the switch disposed on the resistor side is resistor-side switch SB. Intermediate switch SC is one switch disposed on a connecting line connecting intermediate portions between cell-side switches SA and resistor-side switches SB. Switches SA, SB, and SC are set to off in an initial state, and on/off of each of switches SA, SB, and SC is switched under the control of cell balance control apparatus 10.

Figure 2:
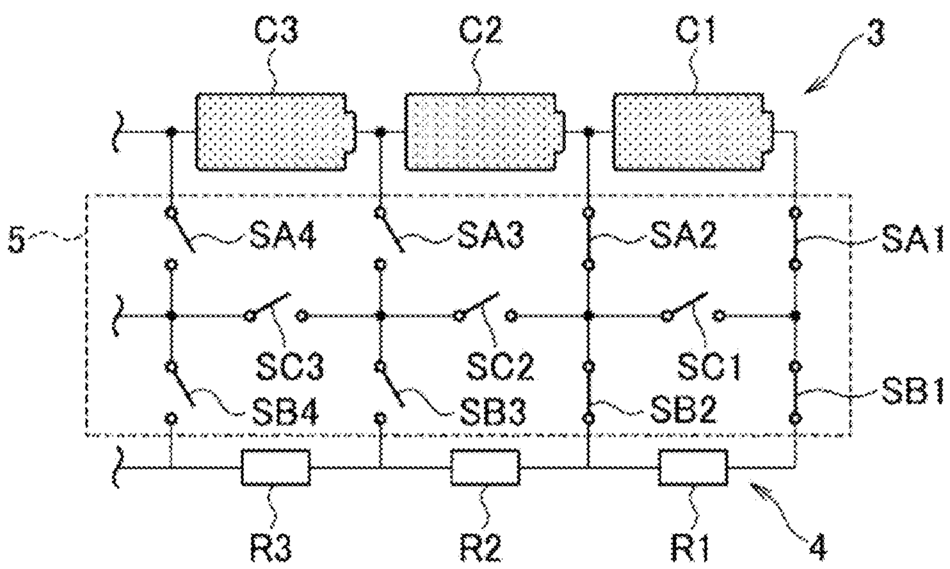
FIG. 2 is one example of a circuit diagram during high-rate discharge.

For example, when the target cell is first cell C1 and one resistor R is connected to first cell C1, first cell-side switch SA1, first resistor-side switch SB1, second cell-side switch SA2, and second resistor-side switch SB2 are set to ON, and other switches SA, SB, and SC are set to OFF (maintained in the initial state) as illustrated in FIG. 2. Thus, first cell C1 is discharged through one resistor R1.

Figure 3:
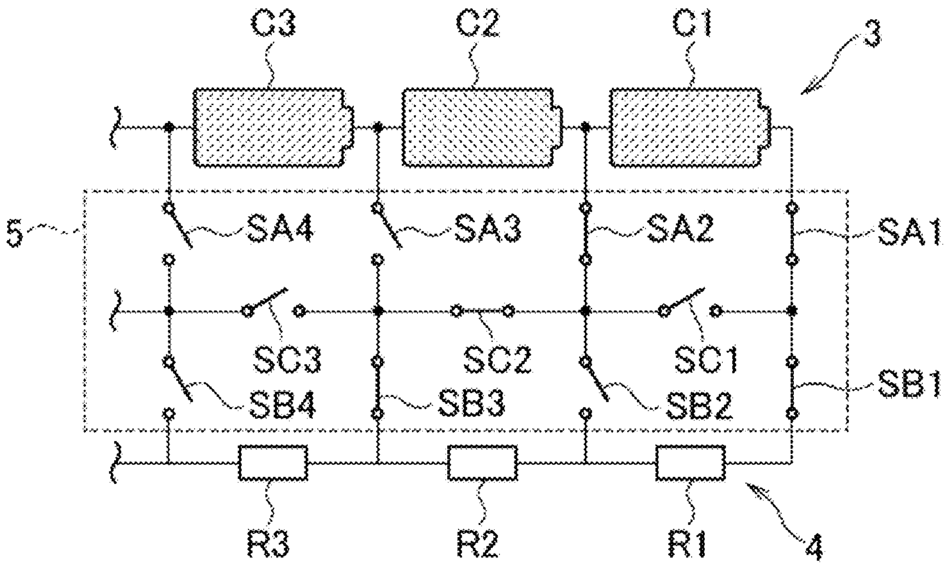
FIG. 3 illustrates one example of a circuit diagram during mid-rate discharge.

When the target cell is first cell C1 and two resistors R are connected to first cell C1, as illustrated in FIG. 3, first cell-side switch SA1, first resistor-side switch SB1, second cell-side switch SA2, third resistor-side switch SB3, and second intermediate switch SC2 are set to ON, and the other switches SA, SB, and SC are set to OFF (maintained in the initial state). As a result, first cell C1 is discharged through two resistors R1 and R2 (combined resistance of R1 and R2).

Figure 4:
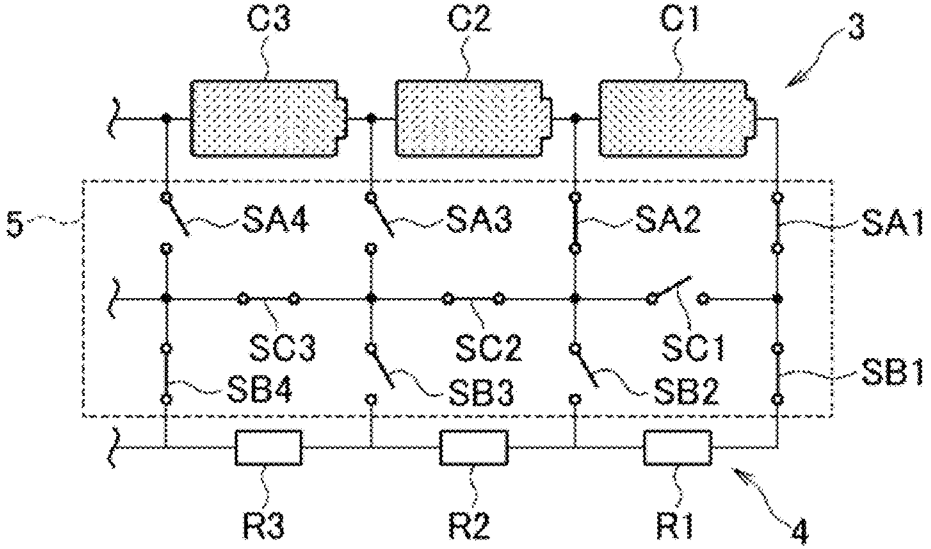
FIG. 4 illustrates one example of a circuit diagram during low-rate discharge.

When the target cell is first cell C1 and three resistors R are connected to first cell C1, first cell-side switch SA1, first resistor-side switch SB1, second cell-side switch SA2, the fourth resistor-side switch SB4, second intermediate switch SC2, and third intermediate switch SC3 are set to ON, and other switches SA, SB, and SC are set to OFF (maintained in the initial state) as illustrated in FIG. 4. Thus, first cell C1 is discharged through three resistors R1, R2, and R3 (the combined resistance of R1, R2, and R3).

By controlling on/off of each of switches SA, SB, and SC, a cell other than first cell C1 can be used as the target cell, and four or more resistors R can be connected to the target cell. The voltage values of battery cells C are equalized by discharging the battery cell as the target cell among the plurality of battery cells C which has the highest voltage.

Comparison between the case where the number of resistors R connected to the target cell is one (FIG. 2), the case where the number of resistors R connected to the target cell is two (FIG. 3), and the case where the number of resistors R connected to the target cell is three (FIG. 4) reveals that the resistance value (combined resistance value) increases, the amount of current flowing (current value) decreases, and the discharge rate decreases as the number of connected resistors R (number of resistors) increases. That is, when the number of resistors connected in series to the target cell is one, the target cell is discharged at a high rate (high rate discharge). When the number of resistors is two, the target cell is discharged at a medium rate (medium rate discharge). When the number of resistors is three, the target cell is discharged at a low rate (low rate discharge).

Cell balance control apparatus 10 includes a Central Processing Unit (CPU), a Read Only Memory (ROM), a Random Access Memory (RAM), an input/output circuit, and the like. Cell balance control apparatus 10 controls on/off of connection/disconnection section 5 (switches SA, SB, and SC) of cell balance circuit 2 in accordance with a preset program, and performs a cell balance control on battery 1 (control for adjusting the cell balance by discharging the target cell).

Cell balance control apparatus 10 includes voltage detection section 11, target voltage setting section 12, and switch control section (connection/disconnection control section) 13.

Voltage detection section 11 acquires the voltage value of each battery cell C, and outputs the acquired voltage value to target voltage setting section 12 and switch control section 13. Voltage detection section 11 may directly acquire the voltage value of each battery cell C by a voltage sensor or may acquire the voltage value via another detection sensor or the like.

Target voltage setting section 12 sets, as a final target voltage value of the target cell, a predetermined voltage value lower than the highest voltage among the voltage values acquired by voltage detection section 11 (for example, the lowest voltage among the voltage values acquired by voltage detection section 11). In addition, a first intermediate target voltage value and a second intermediate target voltage value are set between the current voltage value and the final target voltage value of the target cell (current voltage value>first intermediate target voltage value>second intermediate target voltage value>final target voltage value).

For example, the total amount of the current (total current amount) flowing when the target cell is discharged up to the final target voltage value is estimated. A voltage value of the target cell after ⅓ of the total current amount flows is set as the first intermediate target voltage value, and a voltage value of the target cell after ⅔ of the total current amount flows is set as the second intermediate target voltage value. The first intermediate target voltage value and the second intermediate target voltage value may be set by another method (for example, by dividing a difference between the current voltage value and the final target voltage value into three equal parts).

When a predetermined execution condition is satisfied (for example, when a difference between the highest voltage and the lowest voltage among the voltage values acquired by voltage detection section 11 exceeds a predetermined threshold), switch control section 13 controls connection/disconnection section 5 such that battery cell C having the highest voltage is set as the target cell and the target cell is discharged.

For example, when first cell C1 is the target cell, switch control section 13 connects one resistor R1 to first cell C1 to discharge first cell C1 until the voltage value of first cell C1 reaches the first intermediate target voltage value (high-rate discharge illustrated in FIG. 2). When the voltage value of first cell C1 reaches the first intermediate target voltage value, two resistors R1 and R2 are connected to first cell C1 and first cell C1 is discharged until the second intermediate target voltage value is reached (medium-rate discharge illustrated in FIG. 3). When the voltage value of first cell C1 reaches the second intermediate target voltage value, three resistors R1, R2, and R3 are connected to first cell C1 and first cell C1 is discharged until the final target voltage value is reached (low-rate discharge illustrated in FIG. 4). When the voltage value of first cell C1 reaches the final target voltage value, discharging first cell C1 is ended, and switches SA, SB, and SC are returned to the initial state.

Figure 5:
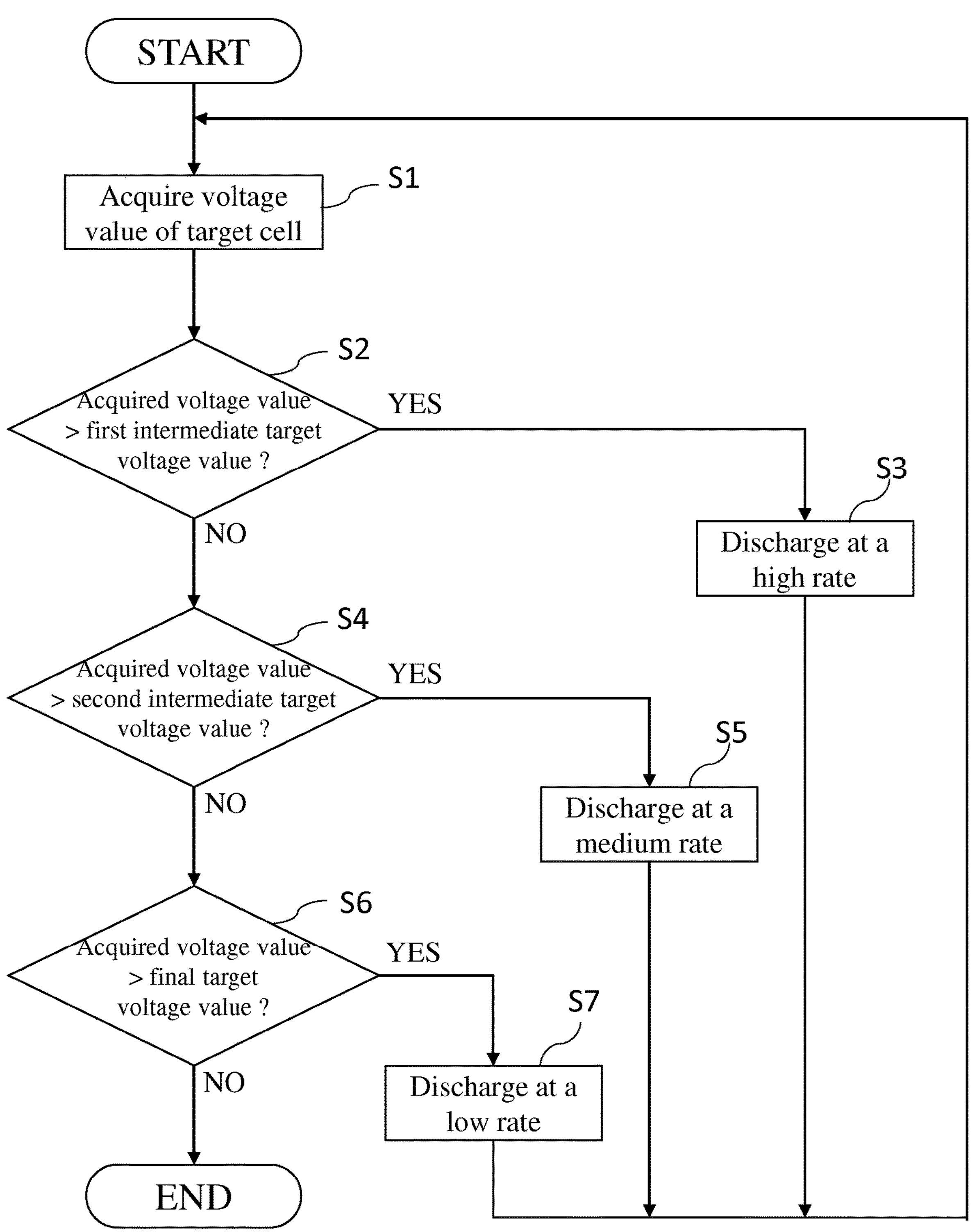
FIG. 5 is a flowchart illustrating a process executed by the cell balance control circuit.

Next, the cell balance control executed by switch control section 13 will be described based on the flowchart of FIG. 5.

When this control is started, the voltage value of the target cell is acquired (step S1), and the acquired voltage value of the target cell is compared with the first intermediate target voltage value (step S2).

Immediately after this control is started, the voltage value of the target cell exceeds the first target voltage value (step S2: YES). Thus, one resistor R is connected to the target cell and the target cell is discharged at a high rate (step S3). During the high-rate discharge, voltage values of the target cell are compared with the first intermediate target voltage value at any time (step S2). While the voltage value of the target cell is greater than the first target voltage value, the high-rate discharge is continued (step S3).

When the voltage of the target cell decreases by the high-rate discharge and reaches the first target voltage value (step S2: NO), the voltage value of the target cell is compared with the second intermediate target voltage value (step S4).

Immediately after the first target voltage value is reached, the voltage value of the target cell exceeds the second target voltage value (step S4: YES). Thus, two resistors R are connected to the target cell and the target cell is discharged at a medium rate (step S5). During the medium-rate discharge, voltage values of the target cell are compared with the second intermediate target voltage value at any time (step S4). While the voltage value of the target cell is greater than the second target voltage value, the medium-rate discharge is continued (Step 5).

When the voltage of the target cell decreases by the medium rate discharge and reaches the second target voltage value (step S4: NO), the voltage value of the target cell is compared with the final target voltage value (step S6).

Immediately after the second target voltage value is reached, the voltage value of the target cell exceeds the final target voltage value (step S6: YES). Thus, three resistors R are connected to the target cell and the target cell is discharged at a low rate (step S7). During the low-rate discharge, voltage values of the target cell are compared with the final target voltage value at any time (step S6). While the voltage value of the target cell is greater than the final target voltage value, the low-rate discharge is continued (step 7).

When the voltage of the target cell decreases by low-rate discharging to reach the final target voltage value (step S6: NO), the present control is ended, and connection/disconnection section 5 is set to the initial state.

As described above, switch control section 13 connects one resistor R to the target cell in series at the start of adjustment of the cell balance, and controls connection/disconnection section 5 so that the number of resistors R connected in series to the target cell increases after the elapse of a predetermined time from the start of adjustment of the cell balance (time until the first target voltage value is reached and time until the second target voltage value is reached) (two resistors R are connected in series after the first target voltage value is reached, and three resistors R are connected in series after the second target voltage value is reached).

For shortening the balance adjustment time, it is advantageous that the amount of current to be supplied is larger. For highly accurate balance adjustment, it is advantageous that the amount of current to be supplied is smaller. In the present embodiment, the number of resistors R connected in series to the target cell can be increased or decreased. Since the number of resistors R connected in series to the target cell in the cell balance control increases stepwise, the amount of current (current value) flowing during discharge decreases stepwise. Accordingly, the discharge rate of the target cell (rate of voltage drop) decreases stepwise. As described above, since the discharge rate of the target cell is decreased stepwise so as to change from the high rate through the middle rate to the low rate. Thus, it is possible to shorten the balance adjustment time while securing the highly accurate balance adjustment. Note that, in the present embodiment, two intermediate target voltage values are set and the discharge rate is reduced in three stages. However, one intermediate target voltage value may be set and the discharge rate may be reduced in two stages, or three or more intermediate target voltages may be set and the discharge rate may be reduced in four or more stages.

Next, a case will be described in which a rectangular wave is generated at an arbitrary frequency by using switches SA, SB, and SC and resistors R of cell balance circuit 5 of the present embodiment, and a state (for example, a deterioration state) of a target cell is estimated by a rectangular wave impedance method, which is a kind of an electrochemical impedance method, using arbitrary battery cell C as the target cell.

Like cell balance control apparatus 10, state estimation apparatus 20 for estimating the state of the target cell by the electrochemical impedance method includes a CPU, a ROM, a RAM, an input/output circuit, and the like. As illustrated in FIG. 1, state estimation apparatus 20 includes switch control section (connection/disconnection control section) 21, current detection section 22, voltage detection section 23, impedance calculation section 24, and state estimation section 25.

Switch control section 21 controls connection/disconnection section 5 so that one resistor R is connected to the target cell (high-rate discharge is set). Since the number of resistors R connected to the target cell is one, the amount of current flowing (current value) is larger than in a case where a plurality of resistors R are connected in series (medium-rate discharge or low-rate discharge).

Current detection section 22 acquires a sensor signal from a current sensor (not illustrated) and detects a current (waveform of the current) flowing through the target cell. Voltage detection section 23 acquires a sensor signal from a voltage sensor (not illustrated) and detects a voltage (waveform of the voltage) of the target cell. Note that voltage detection section 11 of cell balance control apparatus 10 may be used as voltage detection section 23 of state estimation apparatus 20.

Impedance calculation section 24 calculates the impedance spectrum of the target cell based on the frequency components included in the waveforms of the current and the voltage detected at the same timing. For example, a frequency component included in the waveform of the current is detected by performing Fourier transform or wavelet transform on the waveform of the current detected by current detection section 22 (a plurality of temporally continuous current values acquired). Further, a frequency component included in the waveform of the voltage is detected by performing Fourier transform or wavelet transform on the waveform of the voltage detected by voltage detection section 23 (a plurality of temporally continuous voltage values acquired).

Next, impedance calculation section 24 calculates, for each frequency, a ratio between the frequency component included in the waveform of the current flowing through the target cell and the frequency component included in the waveform of the voltage of the target cell, thereby calculating the impedance spectrum of the internal impedance of the target cell. Note that a method similar to the known electrochemical impedance method can be used for calculation of the impedance spectrum of the target cell to be executed by impedance calculation section 24.

State estimation section 25 estimates the state of the target cell based on the impedance spectrum of the internal impedance of the target cell calculated by impedance calculation section 24. For example, a deterioration state of each part (for example, an electrode and an electrolyte solution) of the target cell is estimated based on the impedance spectrum of the internal impedance of the target cell.

According to the present embodiment, since a large amount of current flows through the target cell, an influence of noise on the current detection value of current detection section 22 is reduced. Therefore, an appropriate estimation result can be obtained by state estimation section 25.

Although the present invention has been described based on the above-described embodiments, the present invention is not limited to the contents of the above-described embodiments and can be modified as appropriate without departing from the scope of the present invention. That is, it is needless to say that all other embodiments, examples, operation techniques, and the like made by a person skilled in the art or the like based on this embodiment are included in the scope of the present invention.

INDUSTRIAL APPLICABILITY

The present invention is applicable to a battery in which a plurality of battery cells are connected in series.

What is claimed is:

1. A cell balance control system, comprising a battery circuit, the cell balance control system being configured to adjust a cell balance by discharging a target cell of the battery circuit, wherein the battery circuit comprises:

a cell group comprising a plurality of battery cells connected in series;

a resistor group comprising a plurality of resistors connected in series; and a connection/disconnection section configured to connect and disconnect the cell group to the resistor group, wherein the connection/disconnection section is configured to be capable of changing a number of the resistors connected in series to any one target cell of the plurality of battery cells, and the cell balance system further comprises a connection/disconnection control section configured to control the connection/disconnection section such that a predetermined number of the resistors are connected in series to the target cell at a start of adjustment of the cell balance and the number of the resistors connected in series to the target cell increases from the predetermined number after a predetermined time elapses since the start of adjustment of the cell balance.

2. A state estimation apparatus configured to detect a current flowing through a target cell of a battery circuit, detect a voltage of the target cell, calculate an impedance spectrum of an internal impedance of the target cell based on a frequency component included in a waveform of each of the current and the voltage detected at a same timing, and estimate a state of the target cell based on the impedance spectrum calculated, wherein the battery circuit comprises:

a cell group comprising a plurality of battery cells connected in series;

a resistor group comprising a plurality of resistors connected in series; and a connection/disconnection section configured to connect and disconnect the cell group to the resistor group, wherein the connection/disconnection section is configured to be capable of changing a number of the resistors connected in series to any one target cell of the plurality of battery cells, and the state estimation apparatus further comprises a connection/disconnection control section configured to control the connection/disconnection section such that one resistor is connected in series to the target cell.

* * * * *